July 10, 1962 C. A. TRUMAN 3,043,121
COUPLER FOR SEWER RODS AND THE LIKE
Filed June 30, 1961
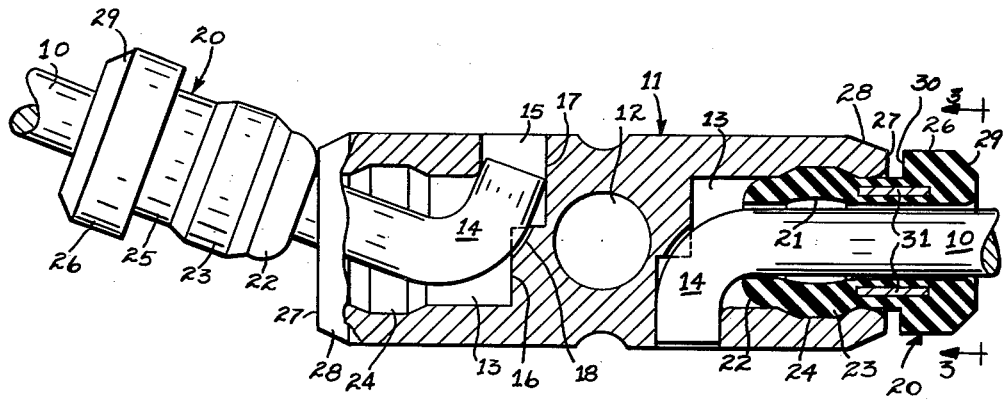
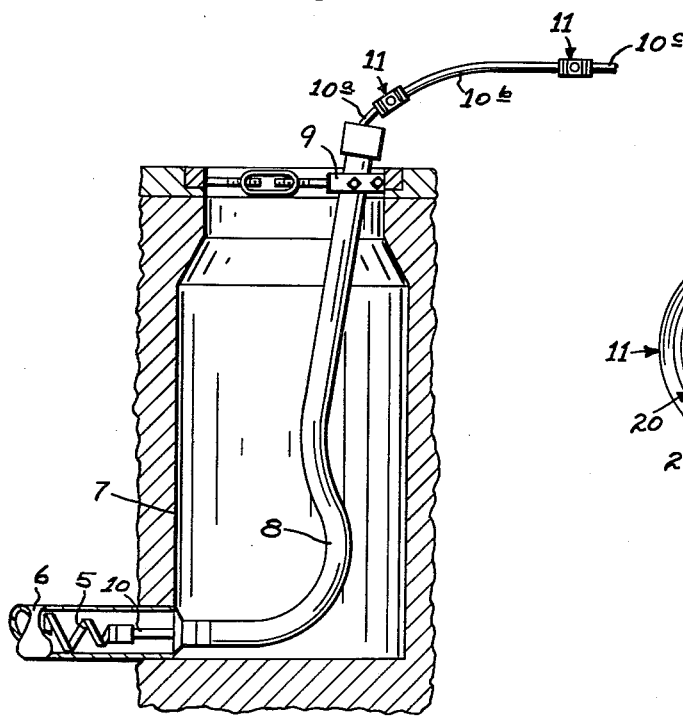
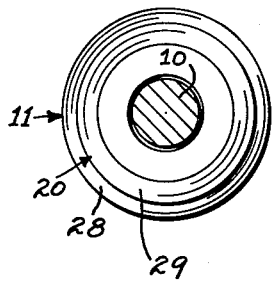
INVENTOR.
Chester A. Truman
BY Wells & St. John
Attys.

United States Patent Office 3,043,121
Patented July 10, 1962

3,043,121
COUPLER FOR SEWER RODS AND THE LIKE
Chester A. Truman, W. 2528 Garland Ave.,
Spokane, Wash.
Filed June 30, 1961, Ser. No. 120,978
5 Claims. (Cl. 64—6)

The present invention relates to improvements in a coupler for sewer rods and the like.

In the most commonly used sewer rods the lengths of rods have the ends formed with a short bend which is adapted to extend into a relatively large entrance opening of the coupler body and move outwardly into an aperture in the coupler body. An exteriorly threaded sleeve is slidably mounted on the rod and the interior of the large entrance opening into the coupler is threaded to engage the sleeve threads so that the sleeve can be secured in the coupler after the rod is in place and will lock the rod against removal from the coupler. The construction just described is adequate to hold the rod in position in the coupler and still permit certain limited freedom of the rod within the threaded sleeve for the bending and flexing of the rod that takes place in the normal usage. The endwise force on the rod is, of course, transmitted directly through the rod and the coupler through the hooked end of the rod and the sleeve does not have to withstand these forces.

It is the purpose of my invention to provide a novel coupler and sleeve construction which eliminates the difficulty that arises in the use of the threaded sleeve in the coupler. These difficulties, although small, are important. One difficulty is the time delay that is necessary to thread the sleeve into the coupler after the rod has been inserted. This is avoided with my improved coupler and sleeve combination. Another difficulty lies in the fact that the threads may be damaged, either on the exterior or on the sleeve by rough handling of the rods with the sleeve thereon, or the threads on the interior of the coupler may be damaged, making it difficult and sometimes impossible to start the sleeve into the coupler threads. Also, the threaded sleeve in use can turn until the sleeve is free from the coupler and the rod can then disconnect from the coupler.

The nature and advantages of my invention will appear more fully from the following description and the accompanying drawings wherein my invention is illustrated. The drawings and description are illustrative only and are not to limit the invention except insofar as it is limited by the claims.

In the drawings:

FIGURE 1 is a sectional view through a coupler and sleeve combination showing one rod end secured in place and the end of the other rod being inserted in the coupler;

FIGURE 2 is a somewhat diagrammatic view through a manhole and sewer pipe connection to illustrate generally how the sewer rod is used; and FIGURE 3 is a sectional view taken on the line 3—3 of FIGURE 1.

Referring now to FIGURE 2 of the drawings, this figure is supplied to show one way in which sewer rods are used in operating a cleaning tool 5 in a pipe 6 which is located in the bottom of a manhole 7. A guiding tube 8 is inserted in the manhole and is secured by a mounting device 9. The sewer rod 10 is extended through the guiding tube 8 from the tool 5 and additional lengths of sewer rods shown at 10a, 10b and 10c are coupled on as needed, to move the tool 5 along the pipe 6. For this purpose couplers 11 are used. My invention is directed to an improvement in the connection of the couplers 11 to the rods 10.

The common form of coupler 11 is illustrated in section in FIGURE 1. This coupler has a transverse aperture 12 through which a twisting rod or stem can be inserted for turning the sewer rod. Both ends of the coupler 11 have enlarged recesses 13 therein which permit the rod 10, which has a hooked end 14, to be inserted in such a manner that the hooked end 14 seats in an aperture provided in the wall of the coupler between the recesses 13 and the cylindrical exterior of the coupler. The hooked end of the sewer rod and the coupler wall bounded by the aperture 15 take the endwise thrusts that are necessary in inserting and removing the sewer cleaning tool from the sewer pipe. The bottom of the recess 13 is stepped as indicated at 16 and 17 and a guide groove 18 is provided across the corners of the surfaces 16 and 17 to support the rod transversely and enable it to resist the twisting forces that are often applied to it with less play than would otherwise be the case. The construction thus far described is well known and in common use in the art.

It is neceassry, of course, to have some means for centering the rod 10 in the recess 13 and heretofore this centering has been accomplished by threading the recess 13 and providing a threaded sleeve with a polygonal head on the rod so that the sleeve may be threaded into the recess 13 to limit angular movement of the rod with respect to the coupler and thus prevent the rod from coming out of the coupler. As pointed out hereinbefore, these sleeves do not fully answer the problem of securing the rod in position. According to my invention I provide a novel sleeve 20 for insertion in the recess 13 and I provide a novel contour for the recesses 13 to cooperate with the sleeve.

The sleeve 20 has an interior bore 21 which closely fits the rod 10 but permits enough play that it will slide freely on the rod. The amount of play is exaggerated, as shown in FIGURE 1 of the drawings. The sleeve has at one end a rounded guide portion 22, the exterior diameter of which will slip into the recess 13 to start the sleeve into the coupler 11. Adjacent the end 22 the sleeve has an enlarged rounded portion 23 which must be compressed in order to permit the sleeve to enter the recess 13. In order to permit this compression, this portion of the sleeve must be of a resilient material. Many synthetic rubbers or resilient synthetic resin compositions are satisfactory for this purpose. In fact, natural rubber is also suitable. The coupler 11 has its recesses 13 hollowed out as indicated at 24 to allow the bulge or enlargement 23 to expand out as the sleeve is driven into the recess 13. A neck portion 25 is provided on the sleeve 20 adjacent the bulge 23 to fit snugly in the portion of the recess 13 between the end of the coupler and the hollowed out pocket 24. Adjacent the neck 25 the sleeve is provided with a driving head 26 which is smaller than the major diameter of the coupler 15 and preferably of about the same diameter as the tip 27 of the coupler.

The ends of the coupler are tapered at 28 adjacent the tips 27 and the head 26 of the sleeve is made small enough so that this tapered end of the coupler may be used to apply a driving tool for driving the rod endwise, if desired. The head 26 is also tapered at 29 so that the coupler will slide past an obstruction readily. The tip 27 of the coupler and the annular face 30 of the sleeve head provide shoulders for the insertion of a wedge to withdraw the sleeve from the coupler whenever the rod is to be separated from the coupler.

With the use of my improved construction the assembly of the rod with the coupler merely involves a simple driving operation for driving the sleeve 20 on the rod into the recess 13 of the coupler until the enlargement 23 seats in the pocket 24 of the coupler. Once inserted, the sleeve acts to maintain the rod substantially centered in the coupler, but due to its resilient nature, it will permit the rod to flex with the sleeve more evenly than was heretofore possible with the metallic threaded sleeve. If desired, the most vulnerable part of the sleeve 20, namely the neck 25, may be reenforced or stiffened in any suitable manner. I have shown as one simple manner of doing this a metallic band 31 molded into the sleeve at the neck portion 25. It will be appreciated that the head 26, being of substantial cross section, will support the band 31 adequately in the normal usage of the rod and coupler. The sleeve 20, of course, is not subjected to endwise forces of any appreciable amount. The endwise pull on the rod is communicated to the coupler through the hooked end portion 14. The twisting and bending of the rod will subject the sleeve to radial forces but the yielding nature of the sleeve serves to distribute these forces and prevent the extreme bending stresses that are sometimes reached with a metallic sleeve at the point where the rod leaves the sleeve. My improved construction therefore protects the rod against such extreme stresses. Since there is little or no endwise thrust on the sleeve 20 in the normal usage of the coupler, the enlargement at 23 need not be very great and it does maintain the sleeve in place against accidental dislodgement regardless of the twisting and turning of the rods 10. In this regard the present sleeve to coupler connection is more reliable than the threaded connection which could work loose by the sleeve turning in the right direction with respect to the coupler.

The essential features of the connection between the sleeve 20 and the coupler 11 are: close slidable interfitting of the sleeve outer surface with the annular inner surface of the coupler defining the recess 13, a pocket 24 in one of these surfaces and an enlargement or bulge 23 in the other surface to seat in the pocket with the sleeve being resilient enough to permit insertion of the sleeve into the recess 13 far enough to align the pocket and the enlargement.

It is believed that the nature and advantages of my invention will be clear from the foregoing description.

Having thus described my invention, I claim:

1. In a coupler for rod sections such as sewer rods wherein endwise forces or rotative forces are transmitted between the rod section and the coupler by means of an end portion on the rod curved to extend transversely to the rod axis and a seat in the coupler spaced from the end thereof and extending radially with respect to the coupler axis, the coupler having an axial opening extending inward from the rod receiving end thereof to the seat, said opening being large enough for insertion of said curved end into said seat, releasable means operable to hold said rod within the opening with the curved end in said seat and the rod substantially centered in said axial opening comprising a sleeve slidably fitted on said rod, said sleeve having a resilient guide portion at one end readily slidable into said opening, and having a head portion at the other end larger than the opening, with a resilient neck portion extending between said guide portion and head portion, the inner surface of said coupler defining the opening and the outer surface of said neck portion having cooperating pocket and enlargement portions adapted to interengage upon endwise sliding movement of the sleeve into the opening and to resist removal of the sleeve from the opening.

2. The invention defined in claim 1 wherein said pocket extends completely around the sleeve.

3. The invention defined in claim 1 wherein said neck portion embodies a stiffening means opposing bending of the neck portion of the rod.

4. The invention defined in claim 1 wherein the enlargement comprises an outwardly bulged resilient ring joining the guide portion to the neck portion.

5. The invention defined in claim 1 wherein a reenforcing ring is embedded in the sleeve neck portion adjacent to the head portion.

References Cited in the file of this patent

UNITED STATES PATENTS

| | | |
|---|---|---|
| 2,110,202 | Crane | Mar. 8, 1938 |
| 2,152,636 | Crane | Apr. 4, 1939 |
| 2,208,017 | Crane | July 16, 1940 |
| 2,446,963 | Stone | Aug. 10, 1948 |